United States Patent
Le

(10) Patent No.: US 11,650,340 B2
(45) Date of Patent: May 16, 2023

(54) DETECTION OF SEISMIC DISTURBANCES USING OPTICAL FIBERS

(71) Applicant: Nokia Solutions and Networks OY, Espoo (FI)

(72) Inventor: Thai Son Le, Aberdeen, NJ (US)

(73) Assignee: Nokia Solutions and Networks Oy, Espoo (FI)

(*) Notice: Subject to any disclaimer, the term of this patent is extended or adjusted under 35 U.S.C. 154(b) by 227 days.

(21) Appl. No.: 17/108,057

(22) Filed: Dec. 1, 2020

(65) Prior Publication Data

US 2022/0171081 A1    Jun. 2, 2022

(51) Int. Cl.
*G01V 1/00* (2006.01)
*G01V 1/18* (2006.01)
(Continued)

(52) U.S. Cl.
CPC .............. *G01V 1/008* (2013.01); *G01V 1/18* (2013.01); *H04B 10/25* (2013.01); *H04B 10/615* (2013.01); *H04J 14/02* (2013.01)

(58) Field of Classification Search
CPC .......... G01V 1/008; G01V 1/18; G01V 1/364; G01V 1/226; H04B 10/25; H04B 10/615; (Continued)

(56) References Cited

U.S. PATENT DOCUMENTS 6,587,190 B2    7/2003    Chae et al.
6,621,947 B1    9/2003    Tapanes et al.
(Continued)

FOREIGN PATENT DOCUMENTS

CN    114584251 A  *  6/2022  ............ G01V 1/008
EP    2796847 A2       10/2014
(Continued)

OTHER PUBLICATIONS

Extended European Search Report for corresponding European application No. 21211048.0; dated Jul. 15, 2022 (17 pages).
(Continued)

*Primary Examiner* — Daniel Pihulic
(74) *Attorney, Agent, or Firm* — Mendelsohn Dunleavy, P.C.; Steve Mendelsohn; Yuri Gruzdkov

(57) ABSTRACT

An optical communication system that enables any deployed fiber-optic cable to function as an earthquake-detection sensor. In an example embodiment, a WDM optical transmitter of one network node operates to transmit a CW optical signal together with legacy data-carrying optical signals. At another network node, a low-complexity, low-latency coherent optical receiver is used to obtain time-resolved measurements of the Stokes parameters of the CW optical signal. The signal-processing chain of the optical receiver employs digital filtering to select frequency components of the measurements streams corresponding to seismic disturbances of the fiber-optical cable connecting the nodes. The selected frequency components are then used to compute values of an earthquake indicator, which are reported to a network controller. Based on such reports from three or more nodes, the network controller can determine the epicenter and magnitude of the earthquake and, if warranted, may generate a tsunami forecast.

19 Claims, 8 Drawing Sheets

(51) Int. Cl.
    *H04B 10/25* (2013.01)
    *H04B 10/61* (2013.01)
    *H04J 14/02* (2006.01)
(58) Field of Classification Search
    CPC .............. H04B 10/071; H04B 10/2912; H04B 10/612; H04B 10/614; H04B 10/616; H04B 13/02; H04J 14/02; H04J 14/0278; H04J 14/06; G01H 9/004
    See application file for complete search history.

(56) References Cited

U.S. PATENT DOCUMENTS

| | | |
|---|---|---|
| 7,142,736 B2 | 11/2006 | Patel et al. |
| 7,209,670 B2 | 4/2007 | Fludger et al. |
| 7,555,227 B2 | 6/2009 | Bontu et al. |
| 7,769,305 B1 | 8/2010 | Roberts et al. |
| 7,885,539 B2 | 2/2011 | Leppla et al. |
| 7,940,389 B2 | 5/2011 | Rogers et al. |
| 7,961,331 B2 | 6/2011 | Healey |
| 8,682,159 B2 | 3/2014 | Kovsh et al. |
| 9,337,934 B1 | 5/2016 | Agazzi et al. |
| 9,712,232 B2 | 7/2017 | Jiang et al. |
| 9,906,308 B1 | 2/2018 | Pajovic et al. |
| 10,038,504 B2 | 7/2018 | Winzer et al. |
| 10,161,798 B2 | 12/2018 | Pei et al. |
| 10,284,303 B2 | 5/2019 | Zhu et al. |
| 10,324,002 B2 | 6/2019 | Chen et al. |
| 10,404,400 B2 | 9/2019 | Chen et al. |
| 11,309,959 B2 * | 4/2022 | Le ................... H04B 10/6971 |
| 2005/0196176 A1 | 9/2005 | Sun et al. |
| 2006/0126993 A1 | 6/2006 | Piede et al. |
| 2006/0163457 A1 | 7/2006 | Katsifolis et al. |
| 2008/0152363 A1 | 6/2008 | Koc |
| 2008/0232795 A1 | 9/2008 | Klar et al. |
| 2008/0239448 A1 | 10/2008 | Tanaka et al. |
| 2009/0148164 A1 | 6/2009 | Roberts et al. |
| 2010/0189445 A1 | 7/2010 | Nakashima et al. |
| 2010/0239254 A1 | 9/2010 | Li et al. |
| 2010/0329677 A1 | 12/2010 | Kaneda et al. |
| 2011/0255870 A1 | 10/2011 | Grigoryan et al. |
| 2012/0230629 A1 | 9/2012 | Hill et al. |
| 2012/0315043 A1 | 12/2012 | Nakagawa et al. |
| 2013/0181757 A1 | 7/2013 | Calabro et al. |
| 2013/0336654 A1 | 12/2013 | Arikawa et al. |
| 2014/0079390 A1 | 3/2014 | Kim et al. |
| 2014/0133844 A1 | 5/2014 | Dahlfort et al. |
| 2014/0260638 A1 | 9/2014 | Hood et al. |
| 2014/0328588 A1 | 11/2014 | Sakai et al. |
| 2015/0030331 A1 | 1/2015 | Salsi et al. |
| 2015/0043907 A1 | 2/2015 | Cavaliere et al. |
| 2015/0131988 A1 | 5/2015 | Alfiad et al. |
| 2015/0280856 A1 | 10/2015 | Nakashima |
| 2016/0182182 A1 | 6/2016 | Schmogrow |
| 2016/0218813 A1 | 7/2016 | Farley |
| 2017/0054513 A1 | 2/2017 | Guo et al. |
| 2017/0126312 A1 | 5/2017 | Maniloff |
| 2017/0356805 A1 | 12/2017 | Pei et al. |
| 2018/0198547 A1 | 7/2018 | Mehrvar et al. |
| 2018/0269985 A1 | 9/2018 | Zhu et al. |
| 2019/0052393 A1 | 2/2019 | Barnard et al. |
| 2019/0074908 A1 | 3/2019 | Lee et al. |
| 2019/0101447 A1 | 4/2019 | Pei et al. |
| 2019/0181950 A1 | 6/2019 | Ishimura |
| 2019/0260493 A1 | 8/2019 | Chimfwembe et al. |
| 2019/0379462 A1 | 12/2019 | Razzell |
| 2019/0393964 A1 | 12/2019 | Tehrani et al. |
| 2020/0044734 A1 | 2/2020 | Parkin |
| 2020/0052786 A1 | 2/2020 | Menard et al. |
| 2020/0076508 A1 | 3/2020 | Jia et al. |
| 2020/0106521 A1 | 4/2020 | Ye et al. |
| 2020/0195354 A1 | 6/2020 | Perin et al. |
| 2020/0235842 A1 | 7/2020 | Jia et al. |
| 2020/0266887 A1 | 8/2020 | Rudolph |
| 2020/0328806 A1 | 10/2020 | Shimizu et al. |
| 2020/0328818 A1 | 10/2020 | Razzell |
| 2021/0013962 A1 | 1/2021 | Rad |
| 2021/0099234 A1 | 4/2021 | Graceffo et al. |
| 2021/0376926 A1 * | 12/2021 | Le ................... H04B 10/0795 |
| 2022/0045766 A1 * | 2/2022 | Le ................... H04B 10/614 |
| 2022/0171081 A1 * | 6/2022 | Le ................... G01V 1/008 |

FOREIGN PATENT DOCUMENTS

| | | | |
|---|---|---|---|
| EP | 3404852 A1 | 11/2018 | |
| EP | 3404855 A1 | 11/2018 | |
| EP | 4009014 A2 * | 6/2022 | ............ G01V 1/008 |
| WO | 2018156132 A1 | 8/2018 | |
| WO | WO2020026007 A1 | 2/2020 | |
| WO | 2021168033 A1 | 8/2021 | |
| WO | WO-2021168033 A1 * | 8/2021 | ............ G01H 9/004 |

OTHER PUBLICATIONS

Che, Di, "Coherent Optical Short-Reach Communications", Doctoral Dissertation, University of Melbourne (2016): 135 pages.
Ciaramella, Ernesto, "Polarization-Independent Receivers for Low-Cost Coherent OOK Systems." IEEE Photonics Technology Letters 26.6 (2014): 548-551.
Dorize, Christian, et al., "Enhancing the performance of coherent OTDR systems with polarization diversity complementary codes." Optics Express 26.10 (2018): 12878-12890.
Gordon, J. P., et al., "PMD fundamentals: Polarization mode dispersion in optical fibers." Proceedings of the National Academy of Sciences 97.9 (2000): 4541-4550.
Jignesh, Jokhakar, et al. "Polarization independent optical injection locking for carrier recovery in optical communication systems." Optics Express 25.18 (2017): 21216-21228.
Li, Jie, et al. "Real-time Fast Polarization Tracking Based on Polarization Phase Locking Least Mean Square Algorithm." Optics Express 27.16 (2019): 22116-22126.
Zhang, Jiao, et al. "200 Gbit/s/λ PDM-PAM-4 PON system based on intensity modulation and coherent detection." Journal of Optical Communications and Networking 12.1 (Jan. 2020): A1-A8.
"Fiber Doctor (FD)", www.huawei.com, 2020 [retrieved on Jun. 9, 2020] Retrieved from the Internet: <URL: https://info.support.huawei.com/network/ptmngsys/Web/WDMkg/en/39_fd.html> (4 pages).
"Optical Supervisory Channel (OSC) SFP Transceiver with Integrated Micro-OTDR Now Available from Optical Zonu (OZC)", www.pr.com, 2014 [retrieved on Jun. 8, 2020] Retrieved from the Internet: <URL: https://www.pr.com/press-release/548495> (2 pages).
"OSN 8800—Huawei", www.huawei.com, 2016 [retrieved on Jun. 9, 2020] Retrieved from the Internet: <URL: https://carrier.huawei.com/en/products/fixed-network/transmission/wdm-otn/osn8800> (4 pages).
Roudas, Ioannis "Chapter 10: Coherent Optical Communication Systems." WDM Systems and Networks. Springer, New York, NY. https://doi.org/10.1007/978-1-4614-1093-5_10 (2012): 373-417.
Krummrich, Peter M., et al. "Demanding response time requirements on coherent receivers due to fast polarization rotations caused by lightning events." Optics Express 24.11 (2016): 12442-12457.
Lindsey, Nathaniel J., et al. "Illuminating seafloor faults and ocean dynamics with dark fiber distributed acoustic sensing." Science 366.6469 (2019): 1103-1107.
Marra, Giuseppe, et al. "Ultrastable laser interferometry for earthquake detection with terrestrial and submarine cables." Science 361.6401 (2018): 486-490.
Mazur, Mikael, et al. "Correlation Metric for Polarization Changes." IEEE Photonics Technology Letters 30.17 (2018): 1575-1578.
Yan, Yaxi, et al. "Distributed vibration sensing based on forward transmission and coherent detection." arXiv preprint arXiv:1907.07675 (2019): 1-8.
Zhan, Zhongwen. "Distributed Acoustic Sensing Turns Fiber-Optic Cables into Sensitive Seismic Antennas." Seismological Research Letters 91.1 (2019): 1-15.

(56) References Cited

OTHER PUBLICATIONS

Boitier, F., et al. "Proactive Fiber Damage Detection in Real-time Coherent Receiver." European Conference on Optical Communication (ECOC), Sep. 17-21, 2017. Gothenburg, Sweden (2017): 1-3.
Mazur, Michael, et al. "Detection of Ambient Disturbances Using Dispersive Delays in Optical Fibers." U.S. Appl. No. 17/580,202, filed Jan. 20, 2022;(33 pages).
Wikipedia: Stokes parameters, https://en.wikipedia.org/wiki/Stokes_parameters (2021): 10 pages.
Miarra, Giuseppe, et al. "Ultrastable laser interferometry for earthquake detection with terrestrial and submarine cables." Science 361.6401 (2018): 486-490.
Williams, Ethan F., et al. "Distributed sensing of microseisms and teleseisms with submarine dark fibers." Nature Communications 10, Article 5778 (2019): 1-11.
Šlapák, Martin, et al. "Polarization Changes as Early Warning System in Optical Fiber Networks." 42nd International Conference on Telecommunications and Signal Processing (TSP). Budapest, Hungary. IEEE (2019): 597-600.
"What's shaking? Earthquake detection with submarine cables", www.google.com, 2020 [retrieved on Oct. 29, 2020] Retrieved from the Internet: <URL: https://cloud.google.com/blog/products/infrastructure/using-subsea-cables-to-detect-earthquakes> (7 pages).
ITU-T, "Spectral grids for WDM applications: DWDM frequency grid." Recommendation G.694.1 (Oct. 2020): 1-7.
Le, Thai Son. "Rapid Polarization Tracking in an Optical Channel." U.S. Appl. No. 16/988,874, filed Aug. 10, 2020; (27 pages).

* cited by examiner

*FIG. 2*
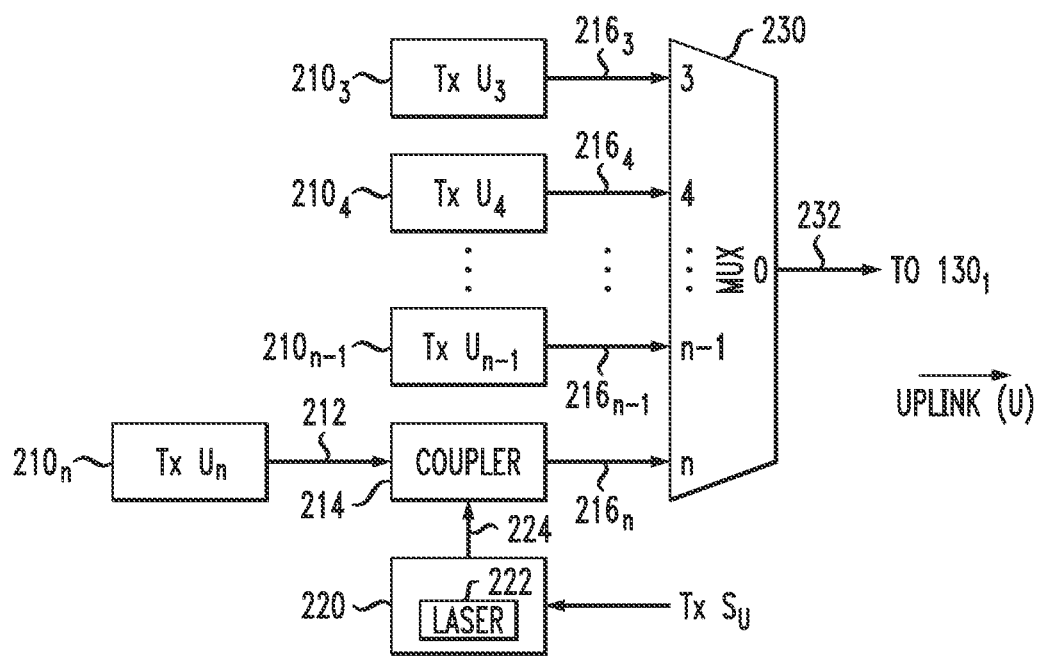
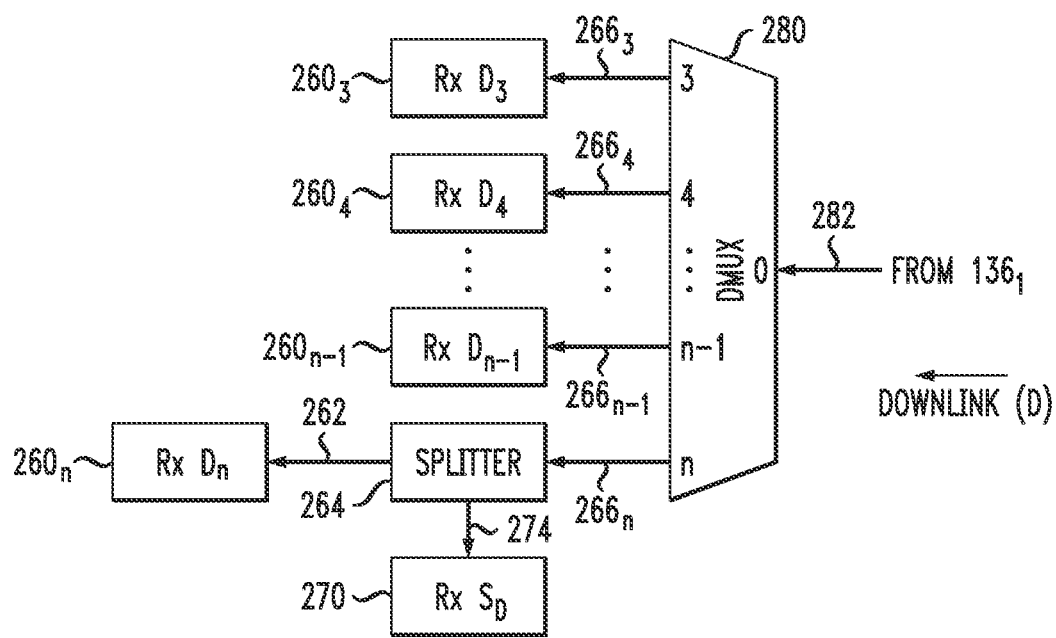

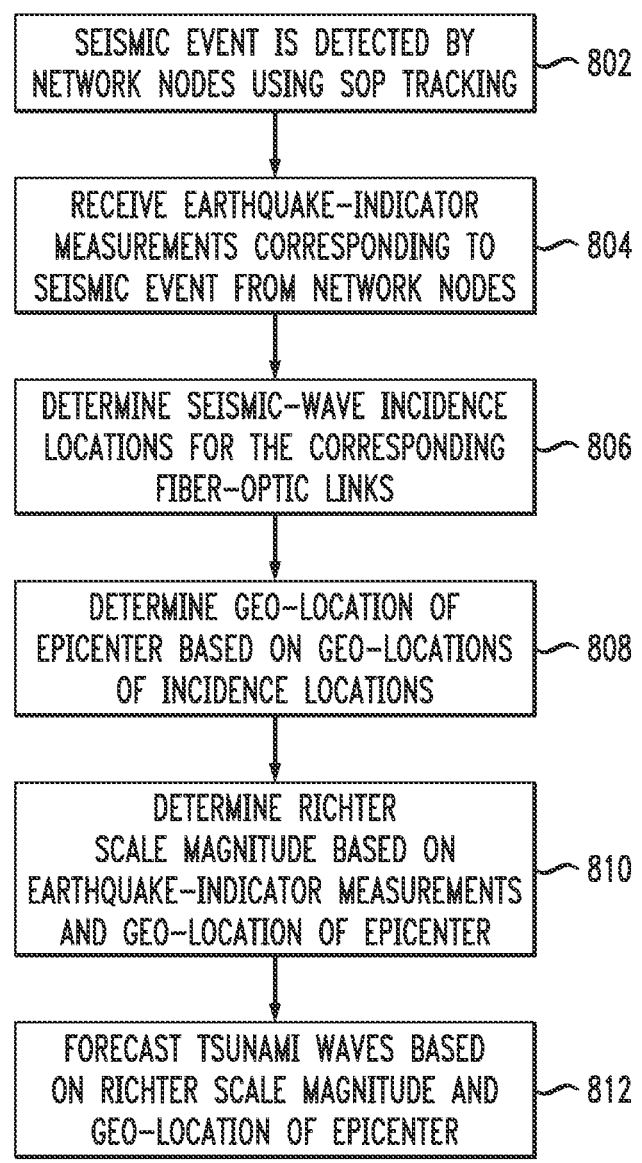

DETECTION OF SEISMIC DISTURBANCES USING OPTICAL FIBERS

BACKGROUND

Field

Various example embodiments relate to seismography and, more specifically but not exclusively, to detection of seismic disturbances using terrestrial and/or submarine optical fibers.

Description of the Related Art

This section introduces aspects that may help facilitate a better understanding of the disclosure. Accordingly, the statements of this section are to be read in this light and are not to be understood as admissions about what is in the prior art or what is not in the prior art.

Sparse seismic instrumentation in the oceans limits earthquake-detection capabilities. For example, the majority of seismic stations are located on land, with only a handful of seismographs being on the ocean floor. As a result, many underwater earthquakes remain under-detected, e.g., because land-based seismic stations are often too far away from the earthquakes' epicenters. Similarly, most tsunami-detection equipment is on shore, which may not be optimal in terms of generating adequate tsunami warnings for the affected coastal communities.

SUMMARY OF SOME SPECIFIC EMBODIMENTS

Disclosed herein are various embodiments of an optical communication system that enables any deployed (e.g., long-haul, terrestrial or submarine) fiber-optic cable to function as an earthquake-detection sensor. In an example embodiment, a wavelength-division-multiplexing (WDM) optical transmitter of one network node is configured to transmit an optical-probe signal together with legacy data-carrying optical signals. At another network node, a low-complexity, low-latency coherent optical receiver is used to obtain time-resolved measurements of the Stokes parameters of the optical-probe signal. The signal-processing chain of the optical receiver employs digital filtering to select frequency components of the measurements streams corresponding to seismic disturbances of the fiber-optical cable connecting the nodes. The selected frequency components are then used to compute values of an earthquake indicator, which are reported to a network controller. Based on such reports from three or more nodes, the network controller can determine the epicenter and magnitude of the earthquake and, if warranted, generate a tsunami forecast.

An example embodiment can beneficially be implemented at a relatively small additional cost, with only small modifications of some of the network's WDM transceivers, and without any modifications of the existing fiber-optic-cable plant.

According to an example embodiment, provided is an apparatus to provide information on earthquakes, the apparatus comprising: an electronic analyzer connected to receive measurements of states of polarization of pairs of light beams, the light beams of each one of the pairs of light beams having traveled in opposite directions between a respective pair of network nodes via a respective optical fiber cable end-connecting the respective pair of network nodes, different ones of the pairs of light beams having traveled over different ones of the respective optical fiber cables; and wherein the electronic analyzer has circuitry configured to characterize one of the earthquakes based on the measurements of the states of polarization of a plurality of the pairs of light beams.

According to another example embodiment, provided is a machine-implemented method of providing information on earthquakes, the machine-implemented method comprising the steps of: (A) receiving measurements of states of polarization of pairs of light beams, the light beams of each one of the pairs of light beams having traveled in opposite directions between a respective pair of network nodes via a respective optical fiber cable end-connecting the respective pair of network nodes, different ones of the pairs of light beams having traveled over different ones of the respective optical fiber cables; and (B) processing, in electronic circuitry, the measurements of the states of polarization of a plurality of the pairs of light beams to characterize one of the earthquakes.

According to yet another example embodiment, provided is an apparatus, comprising: an optical wavelength demultiplexer having a plurality of pass bands to demultiplex optical signals received through an optical fiber; a first optical receiver connected to the optical wavelength demultiplexer to receive a data-modulated optical signal; and a second optical receiver connected to the optical wavelength demultiplexer to obtain time-resolved measurements of Stokes parameters of an optical-probe signal, both of the data-modulated optical signal and the optical-probe signal passing through one of the pass bands of the optical wavelength demultiplexer; and wherein the second optical receiver comprises a digital band-pass filter to filter streams of the time-resolved measurements to select frequency components of the streams corresponding to seismic disturbance of the optical fiber.

BRIEF DESCRIPTION OF THE DRAWINGS

Other aspects, features, and benefits of various disclosed embodiments will become more fully apparent, by way of example, from the following detailed description and the accompanying drawings, in which:

FIG. 2 shows a block diagram of a wavelength-division-multiplexing (WDM) optical transceiver that can be used in the optical communication system of FIG. 1 according to an embodiment;

FIG. 8 shows a flowchart of an example signal-processing method that can be used in the fiber-optic network of FIG. 7 according to an embodiment.

DETAILED DESCRIPTION

Some embodiments may benefit from the use of apparatus, method, and some features disclosed in U.S. patent application Ser. No. 16/988,874, filed on 10 Aug. 2020, which is incorporated herein by reference in its entirety.

Although some example embodiments are described herein below in reference to submarine optical fibers and/or submarine fiber-optic cables, a person of ordinary skill in the art will readily understand, based on the provided description, how to make and use embodiments that employ terrestrial optical fibers and/or terrestrial fiber-optic cables.

Some embodiments may be used for detection of earthquakes and/or prediction of tsunami waves.

Figure 1:
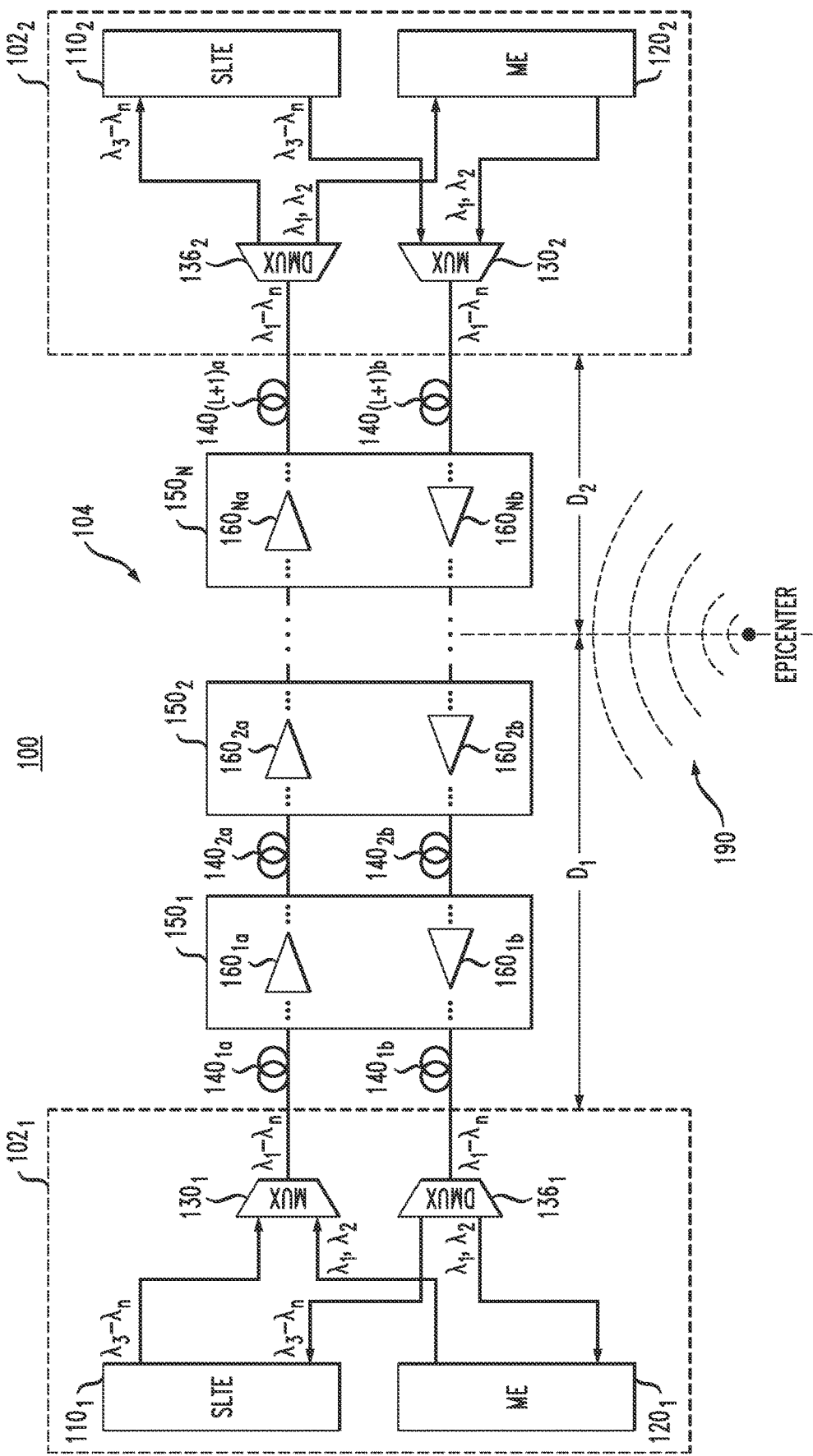
FIG. 1 shows a block diagram of one optical fiber line of an optical communication system in which some embodiments may be practiced.

FIG. 1 shows a block diagram of an optical fiber line of a portion of an optical communication system 100 in which some embodiments may be practiced. System 100 is a long-haul submarine communication system comprising landing stations $102_1$ and $102_2$ connected by way of a wet cable plant 104. Landing stations $102_1$ and $102_2$ are typically further connected to respective terrestrial networks (not explicitly shown in FIG. 1). In an alternative embodiment, system 100 may have one or more additional landing stations connected to different wet cable plant(s), i.e., having a similar form to the wet cable plant 104, as known in the pertinent art, e.g., using one or more branching units and/or completely different submarine fiber cable lines between the additional landing stations (not explicitly shown in FIG. 1).

In an example embodiment, wet cable plant 104 comprises an undersea cable system that includes, inter alia, submersible optical repeaters $150_1$-$150_L$ serially connected by spans 140 of optical fiber, e.g., as indicated in FIG. 1, where L is a positive integer. In the shown embodiment, each span $140_i$ includes two optical fibers, which are labeled $140_{ia}$ and $140_{ib}$, respectively, where i=1, 2, . . . , L+1. The number L of optical repeaters 150 used in wet cable plant 104 depends on the particular embodiment and may be in the range, e.g., from 1 to ~200. A typical length of a fiber span $140_i$ may range from ~50 km to ~150 km, depending on the distance between landing stations $102_1$ and $102_2$. In some embodiments, wet cable plant 104 may not have any optical repeaters between landing stations $102_1$ and $102_2$.

In the shown embodiment, an optical repeater 150 comprises optical amplifiers (OAs) $160_{ja}$ and $160_{jb}$, where j=1, 2, . . . , L. Optical amplifier $160_{ja}$ is configured to amplify optical signals traveling towards landing station $102_2$. Optical amplifier $160_{jb}$ is similarly configured to amplify optical signals traveling towards landing station $102_1$. In an example embodiment, an optical amplifier 160 can be implemented as known in the pertinent art, e.g., using an erbium-doped fiber, a gain-flattening filter, and one or more laser-diode pumps. The laser diodes can be powered by a DC current from the corresponding shore-based power-feeding equipment (PFE, not explicitly shown in FIG. 1), fed through the electrical conductor(s) of the corresponding submarine cable, which also typically contains optical fibers $140_{ia}$ and $140_{ib}$. In some embodiments, the electrical conductors (e.g., wires) may be located near the center of the submarine cable. In some other embodiments, the electrical conductors may have a generally tubular shape, e.g., with a ring-like cross-section in a plane orthogonal to the longitudinal axis of the submarine cable.

In an alternative embodiment, optical repeaters 150 can be designed for two, three, four, or more pairs of optical fibers 140 connected thereto at each side thereof. For example, an optical repeater 150 designed to be compatible with a four-fiber-pair submarine cable typically includes eight optical amplifiers 160 arranged in four amplifier pairs, each pair being similar to the pair of optical amplifiers $160_{ja}$ and $160_{jb}$.

Optical repeater $150_j$ may also comprise a supervisory optical circuit (not explicitly shown in FIG. 1) that enables monitoring equipment (ME) units $120_1$ and $120_2$ located at landing stations $102_1$ and $102_2$, respectively, to monitor the operating status of the optical repeaters. Some embodiments of the supervisory optical circuit are disclosed, e.g., in European Patent Application Nos. EP17305569.0 and EP17305570.8, which are incorporated herein by reference in their entirety.

In an example embodiment, each of ME units $120_1$ and $120_2$ is configured to use dedicated supervisory wavelengths (labeled $\lambda_1$ and $\lambda_2$) for respective supervisory signals that can be sent through the corresponding fiber(s) 140 towards the remote landing station 102. The supervisory optical circuit of each optical repeater $150_j$ is configured to loop back, in the opposite direction, at least a portion of a supervisory optical signal. As a result, ME unit $120_1$ can receive a looped-back supervisory optical signal comprising the portions of the original supervisory optical signal returned to that ME unit by the different supervisory optical circuits of different optical repeaters $150_1$-$150_N$. Similarly, ME unit $120_2$ can receive a looped-back supervisory optical signal comprising the portions of the corresponding supervisory optical signal returned to that ME unit by the different supervisory optical circuits of different optical repeaters $150_1$-$150_N$. The looped-back supervisory optical signals received by ME units $120_1$ and $120_2$ can be processed and analyzed to determine the present operating status and/or certain operating characteristics of at least some or all of optical repeaters $150_1$-$150_N$ in wet cable plant 104. The determined parameters may include but are not limited to: (i) input and output signal levels and the gains of some or all individual optical amplifiers (OAs) $160_{ja}$ and $160_{jb}$; (ii) non-catastrophic faults in individual optical fibers $140_i$, such as any gradual loss increases therein; and (iii) catastrophic failures in individual optical repeaters $150_j$ and/or optical fibers $140_i$.

Landing station $102_1$ comprises a submarine line terminal equipment (SLTE) unit $110_1$ and ME unit $120_1$ connected to wet cable plant 104 by way of an optical wavelength multiplexer (MUX) $130_1$ and an optical wavelength demultiplexer (DMUX) $136_1$ as indicated in FIG. 1. In an example embodiment, SLTE unit $110_1$ includes a wavelength-division-multiplexing (WDM) transceiver (not explicitly shown in FIG. 1; see FIG. 2) configured to transmit and receive payload-carrying optical data signals using carrier wavelengths $\lambda_3$-$\lambda_n$, where n generally denotes the number of WDM channels in system 100. The number n can be in the range, e.g., between ~10 and ~150.

In an example embodiment, carrier wavelengths $\lambda_1$-$\lambda_n$ can be selected in accordance with a frequency (wavelength) grid, such as a frequency grid that complies with the ITU-T G.694.1 Recommendation, which is incorporated herein by reference in its entirety. The frequency grid used in system 100 can be defined, e.g., in the frequency range from about 184 THz to about 201 THz, with a 100, 50, 25, or 12.5-GHz spacing of the channels therein. While typically defined in frequency units, the parameters of the grid can equivalently be expressed in wavelength units. For example, in the wavelength range from about 1528 nm to about 1568 nm, the 100-GHz spacing between the centers of neighboring WDM channels is equivalent to approximately 0.8-nm spacing. In alternative embodiments, other fixed or flexible (flex) frequency grids can be used as well.

In operation, MUX $130_1$ multiplexes the optical signals of wavelengths $\lambda_3$-$\lambda_n$ generated by SLTE unit $110_1$ and the one or more supervisory optical signals of wavelengths $\lambda_1$ and $\lambda_2$, and applies the resulting multiplexed optical signal to optical fiber $140_{1a}$. DMUX $136_1$ de-multiplexes a multiplexed optical signal received from optical fiber $140_{1b}$ into two portions. The first portion has optical signals of wavelengths $\lambda_3$-$\lambda_n$ and is directed to SLTE unit $110_1$. The second portion has the looped-back supervisory optical signals of the one or more wavelengths $\lambda_1$ and $\lambda_2$ and is directed to ME unit $120_1$.

In an example embodiment, ME unit $120_1$ comprises an optical time-domain reflectometer (OTDR, not explicitly shown in FIG. 1) configured to optically probe wet cable plant 104 using wavelengths $\lambda_1$ and $\lambda_2$. For example, ME unit $120_1$ can be designed to perform OTDR measurements by detecting and processing the looped-back supervisory optical signals received from optical repeaters $150_1$-$150_N$. In general, ME unit $120_1$ can be configured to use any suitable OTDR method.

Landing station $102_2$ is generally analogous to landing station $102_1$ and comprises an SLTE unit $110_2$, ME unit $120_2$, a MUX $130_2$, and a DMUX $136_2$. The analogous elements/components of the two landing stations are labeled in FIG. 1 using the same numerical labels, but with different respective subscripts. The descriptions of SLTE unit $110_1$, ME unit $120_1$, MUX $130_1$, and DMUX $136_1$ of landing station $102_1$ given above generally apply to SLTE unit $110_2$, ME unit $120_2$, MUX $130_2$, and DMUX $136_2$, respectively, of landing station $102_2$ and are not repeated here.

In various embodiments, each of landing stations $102_1$ and $102_2$ may further include one or more of the following conventional elements/components: (i) power feeding equipment; (ii) system supervisory equipment; (iii) network management equipment; (iv) cable termination boxes; (v) network protection equipment; and (vi) various interface circuits.

When an earthquake occurs in relative proximity to system 100, mechanical disturbances 190, such as shock waves and seismic waves caused thereby, travel from the epicenter through the Earth's crust to eventually reach wet cable plant 104. Given a sufficiently strong earthquake in sufficiently close proximity to at least some of the optical fibers 140, mechanical disturbances 190 may cause optical-signal perturbations therein detectable by landing stations $102_1$ and $102_2$, e.g., as described below. Appropriate signal processing can then be used, e.g., to accurately estimate the distances $D_1$ and $D_2$ from the incidence point at which mechanical disturbances 190 first reach the corresponding optical fibers 140 to the landing stations $102_1$ and $102_2$, respectively.

FIG. 2 shows a block diagram of a WDM optical transceiver 200 that can be used in SLTE unit $110_1$ according to an embodiment. The transmit and receive optical channels corresponding to transceiver 200 are illustratively referred to as being the "uplink" (or U) channels and "downlink" (or D) channels, respectively. The indexing of the optical channels in FIG. 2 is consistent with the indexing used in FIG. 1, wherein SLTE unit $110_1$ uses the wavelengths $\lambda_1$-$\lambda_n$, and ME unit $120_1$ uses wavelengths $\lambda_1$-$\lambda_2$. A block diagram representing an embodiment of a WDM optical transceiver that can be used in SLTE unit $110_2$ can be obtained by flipping the U and D notations in FIG. 2.

Optical transceiver 200 comprises a plurality of individual-channel optical data transmitters $210_3$-$210_n$ and an optical-probe transmitter 220. Optical-probe transmitter 220 comprises a laser 222. In some embodiments, laser 222 can be a directly modulated laser. In some other embodiments, laser 222 can be a continuous-wave (CW) laser. Optical transmitters $210_3$-$210_{n-1}$ are directly connected to the corresponding optical input ports (labeled 3, . . . , n−1) of an optical MUX 230. Optical transmitters $210_n$ and 220 are, in the illustrated example, connected to a common corresponding optical input port (labeled n) of optical MUX 230 via an optical combiner (e.g., a 3-dB optical coupler) 214, but in other embodiments, the optical transmitter 220 may connect to a separate optical input port of the corresponding optical MUX (not shown). Optical MUX 230 operates in a conventional manner to wavelength-multiplex optical signals $216_3$-$216_n$ applied to optical input ports 3, . . . , n thereof to generate an optical output signal 232 at an optical output port 0 thereof. Optical output signal 232 can be directed to optical MUX $130_1$ and further uplink (also see FIG. 1). In an example embodiment, all of optical signals $216_3$-$216_n$ are spectrally within the amplification band(s) of optical repeaters $150_1$-$150_N$.

Figure 3:
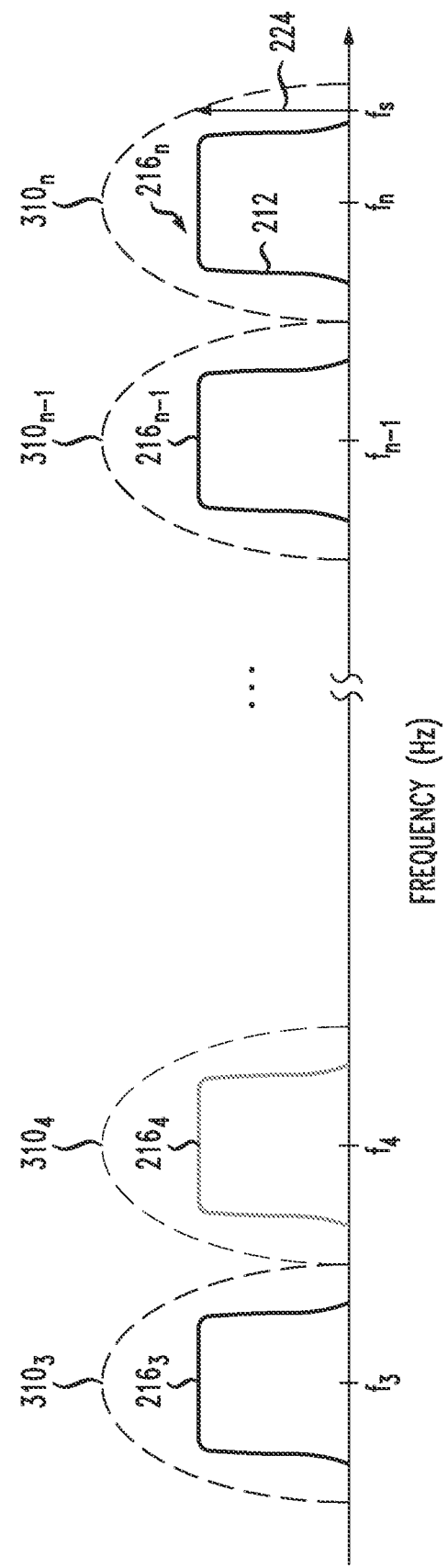
FIG. 3 graphically illustrates certain spectral characteristics of the WDM optical transceiver of FIG. 2 according to an embodiment.

FIG. 3 graphically illustrates spectral characteristics of optical MUX 230 and optical output signal 232 according to an embodiment. More specifically, dashed lines $310_3$-$310_n$ graphically show spectral pass bands of optical MUX 230. Spectral pass band $310_3$ corresponds to the optical path between optical input port 3 and optical output port 0 of optical MUX 230. Spectral pass band $310_4$ corresponds to the optical path between optical input port 4 and optical output port 0 of optical MUX 230, and so on. Spectral pass band $310_{n-1}$ corresponds to the optical path between optical input port n−1 and optical output port 0 of optical MUX 230. Spectral pass band $310_n$ corresponds to the optical path between optical input port n and optical output port 0 of optical MUX 230.

Optical signals $216_3$-$216_n$ are spectrally aligned with the spectral pass bands $310_3$-$310_n$, respectively, as indicated in FIG. 3. For example, for each of optical signals $216_3$-$216_{n-1}$, a center frequency of the signal is approximately spectrally aligned with the center frequency of the corresponding one of the spectral pass bands $310_3$-$310_{n-1}$. In an example embodiment, the center frequencies $f_3, \ldots, f_{n-1}$ of optical signals $216_3$-$216_{n-1}$ may correspond to wavelengths $\lambda_3, \ldots, \lambda_{n-1}$ of FIG. 1. In some embodiments, the wavelengths $\lambda_3, \ldots, \lambda_{n-1}$ may be carrier wavelengths. In some other embodiments, e.g., employing carrier-suppressed modulation, the wavelengths $\lambda_3, \ldots, \lambda_{n-1}$ may approximately be the center wavelengths of the corresponding spectral envelopes.

Optical signal $216_n$ comprises two components, labeled 212 and 224, respectively (also see FIG. 2). Optical signal 212 is generated by optical transmitter $210_n$ and is generally analogous to any of the above-described optical signals $216_3$-$216_{n-1}$. The center frequency of optical signal 212 is the frequency $f_n$, which is approximately spectrally aligned with the center frequency of the spectral pass band $310_n$. In an example embodiment, optical signal 224 is a continuous-wave (CW) signal generated by laser 222 and has a much narrower spectral width than that of optical signal 212. As such, in FIG. 3, optical signal 224 is represented by a spectral line at the frequency $f_s$. The frequency $f_s$ is near the roll-off edge of the spectral envelope of optical signal 212, but is still within the spectral pass band $310_n$. In other embodiments, modulated optical signals may be used to implement optical signal 224 as long as the modulation does not cause one or more modulation sidebands to spectrally overlap with optical signal 212.

In the illustrated example embodiment, the frequency $f_s$ is shown to be in the last optical channel of the corresponding WDM-channel multiplex. In various alternative embodiments, the frequency $f_s$ may be placed within any other selected optical channel in a similar manner. In some embodiments, the frequency $f_s$ can be at any spectral location within the EDFA gain region such that the frequency $f_s$ is also within a spectral pass band of the corresponding MUX/DMUX. For example, if a selected payload channel is not used, then the frequency $f_s$ can be placed near the center frequency of the corresponding pass band of the corresponding MUX/DMUX.

Referring back to FIG. 2, optical transceiver 200 further comprises a plurality of individual-channel optical data receivers $260_3$-$260_n$ and an optical-probe receiver 270. Optical receivers $260_3$-$260_{n-1}$ are directly connected to the corresponding optical output ports (labeled 3, . . . , n–1) of an optical DMUX 280. Optical receivers $260_n$ and 270 are connected to a common corresponding optical output port (labeled n) of optical DMUX 280 via an optical splitter 264, but in other (not-shown) embodiments, may be connected to separate optical output ports of the corresponding optical DMUX. Optical DMUX 280 operates in a conventional manner to wavelength-demultiplex an optical input signal 282 received at an optical input port 0 thereof, e.g., from optical DMUX $136_1$ (also see FIG. 1). The resulting demultiplexed optical signals $266_3$-$266_n$ are directed from optical output ports 3, . . . , n of DMUX 280 to optical receivers $260_3$-$260_{n-1}$ and optical splitter 264, respectively. Optical splitter 264 operates to split optical signal $266_n$ into optical signals 262 and 274, which are then applied to optical receivers $260_n$ and 270, respectively.

In an example embodiment, optical DMUX 280, optical input signal 282, and optical signals $266_3$-$266_n$ may have spectral characteristics analogous to those shown in FIG. 3. In some embodiments, optical DMUX 280 may be implemented using a nominal copy of optical MUX 230, but configured to transmit signals in the opposite direction, i.e., from port 0 to ports 3, . . . , n.

Figure 4:
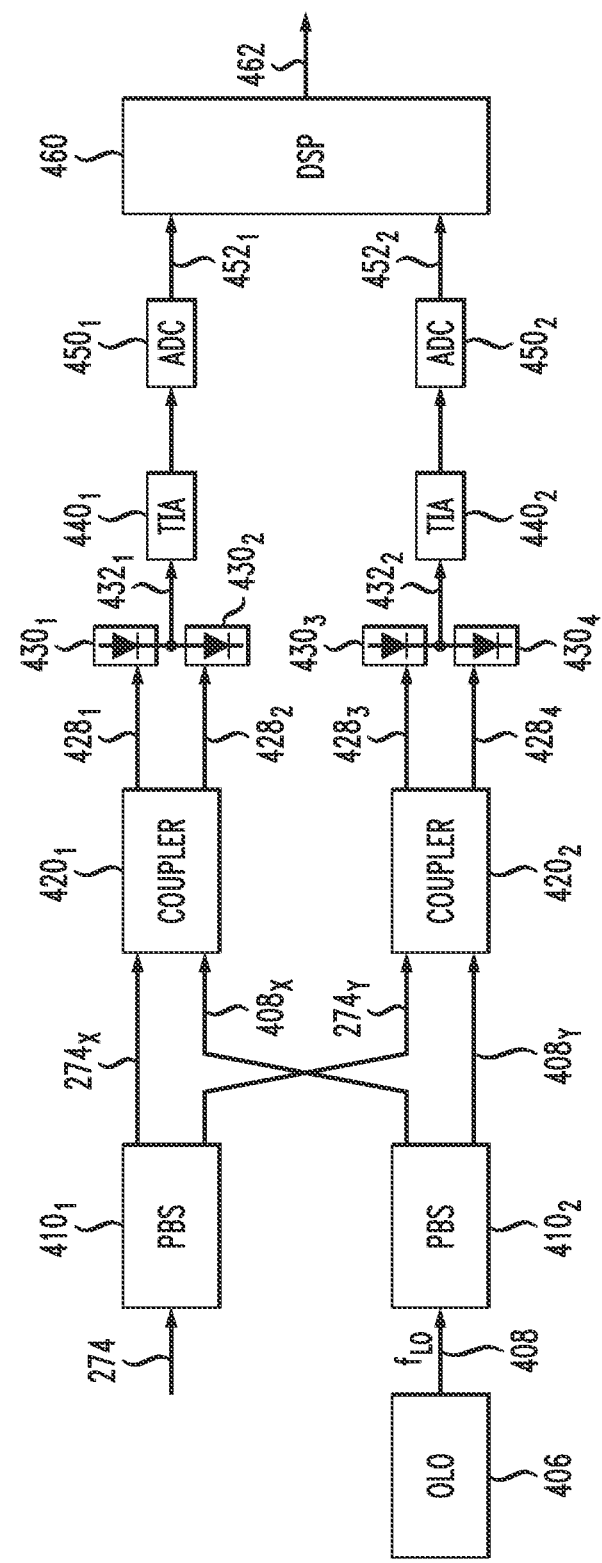
FIG. 4 shows a block diagram of an optical receiver that can be used in the WDM optical transceiver of FIG. 2 according to an embodiment.

FIG. 4 shows a block diagram of optical receiver 270 according to an embodiment. As shown in FIG. 4, optical receiver 270 comprises an optical local-oscillator (OLO) source (e.g., laser) 406, polarization beam splitters (PBS's) $410_1$ and $410_2$, optical couplers $420_1$ and $420_2$, photodiodes $430_1$-$430_4$, transimpedance amplifiers (TIAs) $440_1$ and $440_2$, analog-to-digital converters (ADCs) $450_1$ and $450_2$, and a digital signal processor (DSP) 460. The photodiodes in each of photodiode pairs $430_1$/$430_2$ and $430_3$/$430_4$ are electrically connected in a differential (e.g., balanced) configuration as indicated in FIG. 4.

In operation, PBS $410_1$ receives optical signal 274 (also see FIG. 2) and splits the received light into two relatively orthogonal polarization components, labeled $274_X$ and $274_Y$, respectively. PBS $410_2$ receives an OLO signal 408 generated by OLO source 406 and similarly splits the received light into two relatively orthogonal polarization components, labeled $408_X$ and $408_Y$, respectively. In an example embodiment, OLO signal 408 is a CW optical signal that may have a fixed linear polarization and an optical-carrier frequency $f_{LO}$. The frequency difference $\Delta f$ between the frequencies $f_{LO}$ and $f_s$ (FIG. 3) can be expressed as $\Delta f = |f_{LO} - f_s|$. In some embodiments, $f_{LO}$ may be larger than $f_s$. In other embodiments, $f_{LO}$ may be smaller than $f_s$.

Optical coupler $420_1$ operates to mix optical signals $274_X$ and $408_X$ to generate mixed optical signals $428_1$ and $428_2$, the mixed optical signals being light mixtures with different (e.g., by approximately 180 degrees) relative phase shifts between optical signals $274_X$ and $408_X$. Photodiode pair $430_1$/$430_2$ then converts optical signals $428_1$ and $428_2$ into a corresponding electrical signal $432_1$. Electrical signal $432_1$ is amplified using TIA $440_1$ and optionally filtered, e.g., low-frequency filtered, and the corresponding amplified electrical signal is converted into a digital electrical signal $452_1$ using ADC $450_1$.

Optical coupler $420_2$ similarly operates to mix optical signals $274_Y$ and $408_Y$ to generate mixed optical signals $428_3$ and $428_4$. Photodiode pair $430_3$/$430_4$ converts optical signals $428_3$ and $428_4$ into a corresponding electrical signal $432_2$. Electrical signal $432_2$ is amplified using TIA $440_2$ and optionally filtered, e.g., low-frequency filtered, and the corresponding amplified electrical signal is converted into a digital electrical signal $452_2$ using ADC $450_2$.

Digital electrical signals $452_1$ and $452_2$ are applied to DSP 460, wherein these signals can be processed, e.g., as described below in reference to FIG. 6 and Eqs. (3)-(16), to determine the state of polarization (SOP) of optical signal 274. In response to certain SOP characteristics exhibited by optical signal 274, DSP 460 may further operate to generate control messages, warnings, and/or alarms 462 indicating an occurrence of mechanical disturbances 190 (also see FIG. 1).

In an alternative embodiment, optical receiver 270 may be implemented using a coherent optical receiver disclosed in the above-cited U.S. patent application Ser. No. 16/988,874.

In optics, polarized light can be represented by a Jones vector, and linear optical elements acting on the polarized light and mixtures thereof can be represented by Jones matrices. When light crosses such an optical element, the Jones vector of the output light can be found by taking a product of the Jones matrix of the optical element and the Jones vector of the input light, e.g., in accordance with Eq. (1):

$$\begin{bmatrix} E_x^r \\ E_y^r \end{bmatrix} = J(\theta, \phi) \begin{bmatrix} E_x^t \\ E_x^t \end{bmatrix} \quad (1)$$

where $E_x^t$ and $E_y^t$ are the x and y electric-field components, respectively, of the Jones vector of the input light; $E_x^r$ and $E_y^r$ are the x and y electric-field components, respectively, of the Jones vector of the output light; and $J(\theta,\phi)$ is the Jones matrix of the optical element given by Eq. (2):

$$J(\theta, \phi) = \begin{bmatrix} \cos(\theta) & -e^{-j\phi}\sin(\theta) \\ e^{j\phi}\sin(\theta) & \cos(\theta) \end{bmatrix} \quad (2)$$

where $2\theta$ and $\phi$ are the elevation and azimuth polarization rotation angles, respectively, the values of which can be used to define the SOP. For clarity, the above example of a Jones matrix does not include effects of optical attenuation and/or amplification.

Figure 5:
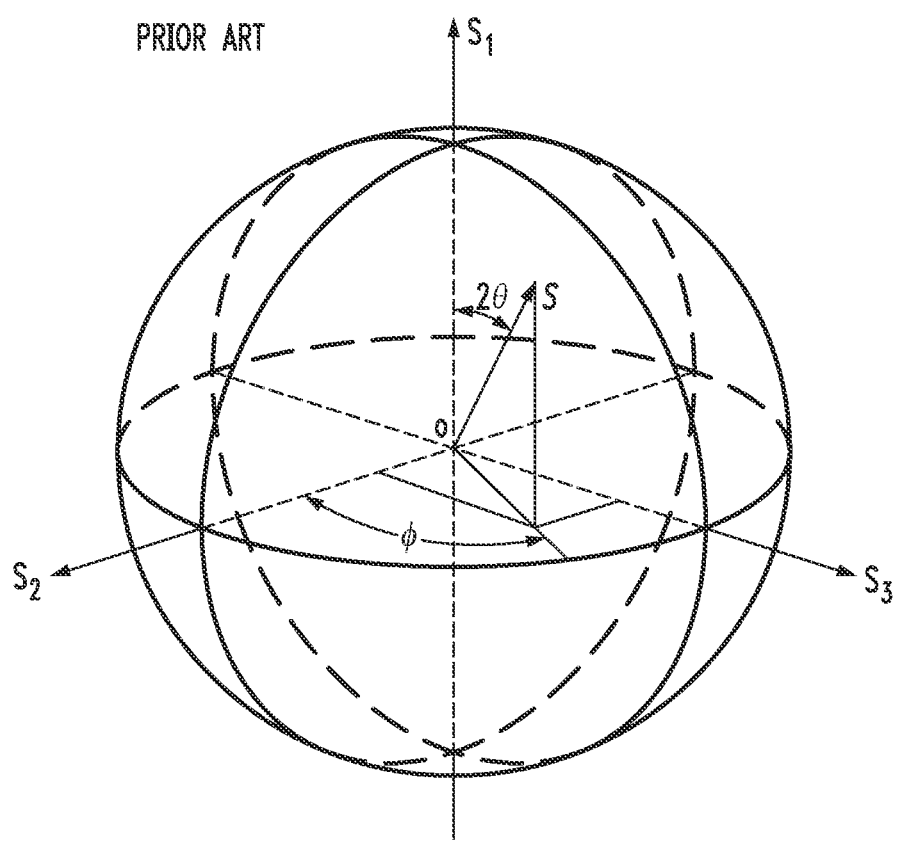
FIG. 5 shows a graphical representation of a state of polarization (SOP) using the Poincare sphere.

FIG. 5 shows a graphical representation of an SOP using the Poincare sphere. Herein, the Poincare sphere is a sphere of radius P centered on the origin of the three-dimensional Cartesian coordinate system, the mutually orthogonal axes $S_1$, $S_2$, and $S_3$ of which represent the corresponding Stokes parameters of the optical field. The radius P represents the optical power and is expressed by Eq. (3):

$$P = \sqrt{S_1^2 + S_2^2 + S_3^2} \quad (3)$$

For a given optical power P, different SOPs can be mapped to different respective points on the surface of the Poincare sphere. For example, the vector S shown in FIG. 5 represents one of such SOPs. An SOP rotation can then be visualized as a corresponding rotation of the vector S.

In some cases, it is convenient to use a unity-radius Poincare sphere, for which P=1. The unity-radius Poincare sphere can be obtained by normalizing the Stokes parameters with respect to the optical power P. For the unity-radius Poincare sphere, the angles $\theta$ and $\phi$ are related to the normalized Stokes parameters $S_1'$, $S_2'$, and $S_3'$ as follows:

$$S_1' = \frac{S_1}{P} = \cos(2\theta) \tag{4a}$$

$$S_2' = \frac{S_2}{P} = \sin(2\theta)\cos(\phi) \tag{4b}$$

$$S_3' = \frac{S_3}{P} = \sin(2\theta)\sin(\phi) \tag{4c}$$

As used herein, the term "polarization tracking" refers to time-resolved measurements of the SOP of an optical signal. In some embodiments, such polarization tracking may include determination, as a function of time, of the angles $\theta$ and $\phi$. In some other embodiments, such polarization tracking may include determination, as a function of time, of the Stokes parameters $S_1'$, $S_2'$, and $S_3'$ of the normalized Stokes vector $S'=(1\ S_1'\ S_2'\ S_3')^T$, where the superscript T means transposed. In yet some other embodiments, such polarization tracking may include determination, as a function of time, of the Stokes parameters $S_0=P$, $S_1$, $S_2$, and $S_3$ of the non-normalized Stokes vector $S=(S_0\ S_1\ S_2\ S_3)^T$.

In an example embodiment, DSP 460 (FIG. 4) may be programmed based on the following simplified model of the optical channel corresponding to the probe light of frequency $f_s$ in system 100 (also see FIGS. 2-3).

For simplification, let us assume that the downlink optical signal 224 generated by SLTE unit 110$_2$ (FIG. 1) has a fixed linear polarization, which can be denoted as the X polarization. In this case, the Jones vector of the downlink optical signal 224 at SLTE unit 110$_2$ can be expressed as $(E_x^t\ 0)^T$, where $E_x^t$ is given by Eq. (5):

$$E_x^t = A \cdot \exp(j\varphi) \tag{5}$$

where A is a constant amplitude; and $\varphi$ is the phase of signal 224. After propagating through wet cable plant 104, the downlink optical signal 224 is received by optical receiver 270 of SLTE unit 110$_1$ as downlink optical signal 274 (also see FIG. 2). Using Eqs. (1)-(2), the Jones vector $(E_x^r\ E_y^r)^T$ of this downlink optical signal 274 can be expressed as follows:

$$E_x^r = \cos(\theta) \cdot A \cdot \exp(j\varphi) \tag{6a}$$

$$E_y^r = \sin(\theta) \cdot A \cdot \exp(j\varphi + j\phi) \tag{6b}$$

The Jones vector $(E_x^{LO}\ E_y^{LO})^T$ of the OLO signal 408 can be expressed as follows:

$$E_x^{LO} = E_y^{LO} = B \cdot \exp(j\delta + j2\pi \cdot \Delta f \cdot t) \tag{7}$$

where B is a constant amplitude; $\delta$ is the phase of signal 408; $\Delta f$ is the frequency difference between the frequencies $f_{LO}$ and $f_s$ as already indicated above; and t is time.

Using Eqs. (6)-(7), the electric fields $E_1$-$E_4$ of the mixed optical signals 428$_1$-428$_4$, respectively, can be expressed as follows:

$$E_1 = \cos(\theta) \cdot A \cdot \exp(j\varphi) + B \cdot \exp(j\delta + j2\pi \cdot \Delta f \cdot t) \tag{8a}$$

$$E_2 = \cos(\theta) \cdot A \cdot \exp(j\varphi) - B \cdot \exp(j\delta + j2\pi \cdot \Delta f \cdot t) \tag{8b}$$

$$E_3 = \sin(\theta) \cdot A \cdot \exp(j\varphi + j\phi) + B \cdot \exp(j\delta + j2\pi \cdot \Delta f \cdot t) \tag{8c}$$

$$E_4 = \sin(\theta) \cdot A \cdot \exp(j\varphi + j\phi) - B \cdot \exp(j\delta + j2\pi \cdot \Delta f \cdot t) \tag{8d}$$

The electrical signals 432$_1$ and 432$_2$ can then be expressed as follows:

$$H_x = |E_1|^2 - |E_2|^2 \tag{9a}$$

$$H_y = |E_3|^2 - |E_4|^2 \tag{9b}$$

where $H_x$ denotes the electrical signal 432$_1$; $H_y$ denotes the electrical signal 432$_2$; and the expressions for $E_1$-$E_4$ are given by Eqs. (8a)-(8d), respectively. For simplification, the optical-to-electrical conversion coefficient is omitted (i.e., is set to one). Expansion of Eqs. (9a) and (9b) with Eqs. (8a)-(8d) reveals that each of $H_x$ and $H_y$ has two spectral components located at the frequencies $+\Delta f$ and $-\Delta f$, respectively. The negative-frequency components of $H_x$ and $H_y$ can be rejected, e.g., using a suitable SSB filter (see, e.g., 610, FIG. 6), which will only pass the positive-frequency components $I_x$ and $I_y$ of signals $H_x$ and $H_y$, respectively, for further processing. Herein, SSB stands for "single sideband." It can be verified using Eqs. (8)-(9) that $I_x$ and $I_y$ can be expressed as follows:

$$I_x = \text{SSB}(H_x) = 2AB \cdot \cos(\theta) \cdot \exp(j\varphi + j\delta + j2\pi \cdot \Delta f \cdot t) \tag{10a}$$

$$I_y = \text{SSB}(H_y) = 2AB \cdot \sin(\theta) \cdot \exp(j\varphi + j\phi + j\delta + j2\pi \cdot \Delta f \cdot t) \tag{10b}$$

Using Eqs. (4a)-(4c) and (10a)-(10b), it can further be verified that the non-normalized Stokes vector $S=(S_0\ S_1\ S_2\ S_3)^T$ of optical signal 274 can be computed as follows:

$$S_0 = |I_x|^2 + |I_y|^2 \tag{11a}$$

$$S_1 = |I_x|^2 - |I_y|^2 \tag{11b}$$

$$S_2 = 2\ \text{Re}(I_x \cdot (I_y)^*) \tag{11c}$$

$$S_3 = -2\ \text{Im}(I_x \cdot (I_y)^*) \tag{11d}$$

where the "*" symbol in the superscript denotes complex conjugation. The normalized Stokes vector $S'=(1\ S_1'\ S_2'\ S_3')^T$ can then be computed by dividing the components of the resulting non-normalized Stokes vector S by the value of $S_0$ computed using Eq. (11a).

In an example embodiment, ADCs 450$_1$ and 450$_2$ can be clocked to operate at a relatively high sampling rate, e.g., $10^9$ samples/second or higher. As a result, the Stokes parameters can be updated by DSP 460 at a fast rate to enable polarization tracking with a relatively high time resolution, thereby providing a sufficient volume of SOP-tracking data for accurately extracting therefrom the relevant characteristics of the SOP dynamics and/or kinetics.

Mechanical disturbances 190 typically cause the SOP to be modulated with characteristic frequencies in the range between approximately 0.1 Hz and approximately 2 Hz. The amplitude of the corresponding frequency components may be related to the amplitude of mechanical disturbances 190. For example, in one possible approximation, a linear dependence of the amplitude of such frequency components on the magnitude of the corresponding earthquake may be assumed for a fixed distance to the epicenter. The attenuation of mechanical disturbances 190 with an increase of the distance to the epicenter may also be incorporated into the signal processing, e.g., as known in the pertinent art.

Figure 6:
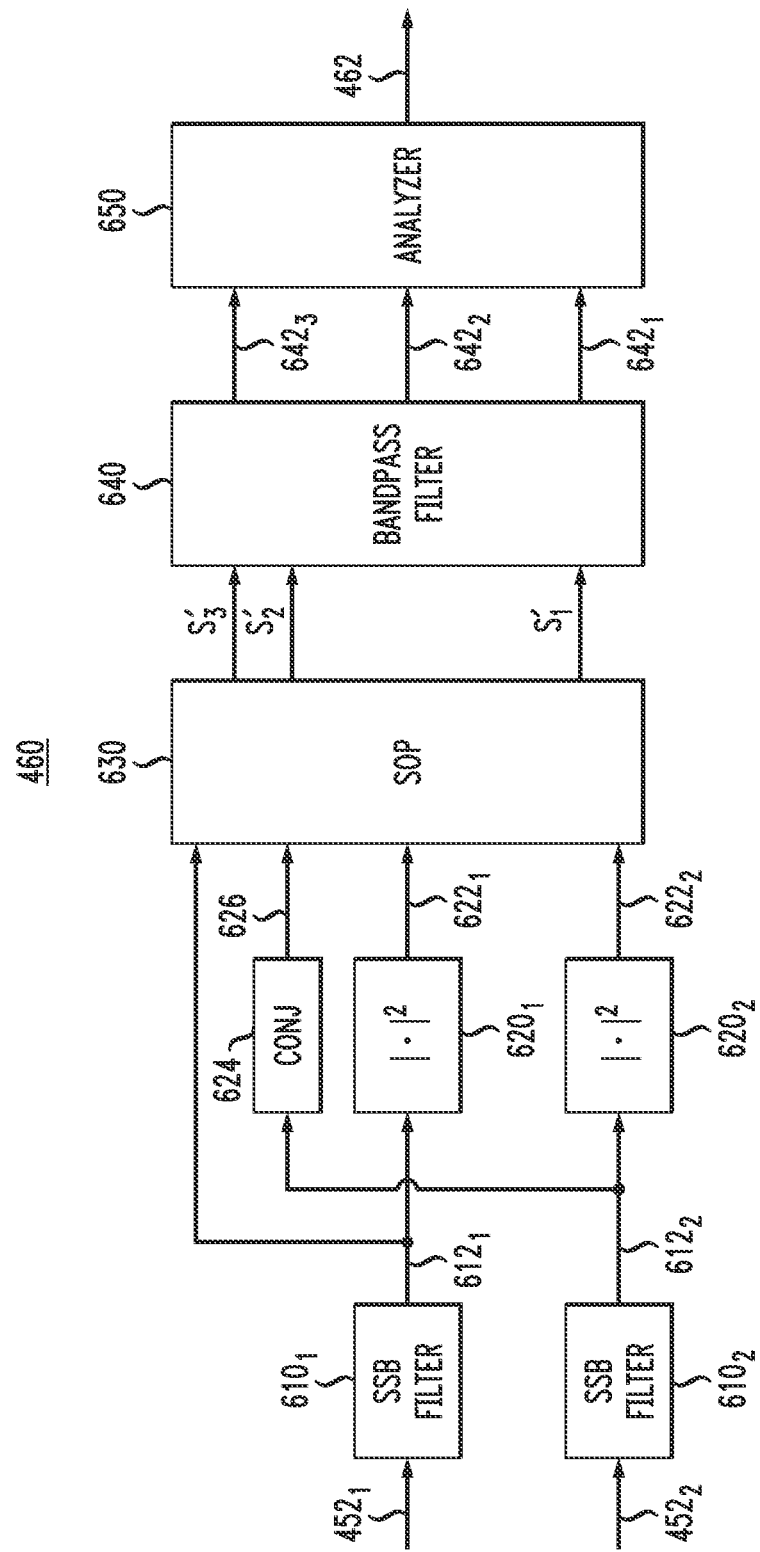
FIG. 6 shows a block diagram of a digital signal processor (DSP) that can be used in the optical transceiver of FIG. 4 according to an embodiment.

FIG. 6 shows a block diagram of DSP 460 according to an embodiment. Digital signals 452$_1$ and 452$_2$ and control signal 462 are also shown in FIG. 6 to better illustrate the relationship between the circuits of FIGS. 4 and 6.

As shown in FIG. 6, DSP 460 comprises SSB filters 610$_1$ and 610$_2$ connected to receive digital signals 452$_1$ and 452$_2$, respectively. In an example embodiment, each of SSB filters 610$_1$ and 610$_2$ operates to convert the received real-valued digital signal 452$_i$ into a corresponding complex-valued digital signal 612$_i$, where i=1, 2. For a real-valued timedependent signal a(t), the transfer function L(•) of the SSB filter can be related to the Hilbert transform $\tilde{H}$ as follows:

$$L(a(t)) = \frac{1}{2}[a(t) + j\tilde{H}(a(t))] \quad (12)$$

A spectral transfer function of the SSB filter $610_i$ is approximately the Heaviside step function having the 0-1 transition thereof at the zero frequency.

DSP 460 further comprises squaring circuits $620_1$ and $620_2$, a conjugation circuit 624, an SOP circuit 630, a band-pass filter 640, and a signal analyzer 650.

Squaring circuit $620_i$ operates to compute a square of the absolute value of each complex value provided by digital signal $612_i$, thereby generating a corresponding real-valued digital signal $622_i$.

Conjugation circuit 624 outputs a conjugated value in response to each complex value provided by digital signal $612_2$, thereby generating a corresponding complex-valued digital signal 626.

SOP circuit 630 uses the received digital signals $612_1$, $622_1$, $622_2$, and 624 to compute three streams of digital values, which are labeled in FIG. 6 as $S_1'$, $S_2'$, and $S_3'$, respectively. Each of those digital values is proportional to the corresponding one of the Stokes parameters $S_1'$, $S_2'$, and $S_3'$ of the normalized Stokes vector $S'=(1\ S_1'\ S_2'\ S_3')^T$ In one example embodiment, this computation can be performed in SOP circuit 630 in accordance with Eqs. (4) and (11). In another example embodiment, this computation can be performed in SOP circuit 630 in accordance with Eqs. (11b)-(11d). The latter embodiment can be used, e.g., when laser 222 is a relatively stable CW laser generating optical signal 224 having a substantially constant output power.

Band-pass filter 640 operates to digitally filter digital signals $S_1'$, $S_2'$, and $S_3'$ to pass through only the frequency components $642_1$-$642_3$ of these signals that are spectrally located within the pass band of the filter. In an example embodiment, the pass band of filter 640 may be between approximately 0.1 Hz and approximately 2 Hz. In some embodiments, band-pass filter 640 may be tunable, e.g., capable of controllably changing one or both of the upper and lower boundaries of the pass band thereof.

Signal analyzer 650 operates to process digital signals $642_1$-$642_3$ to generate control signal 462. In an example embodiment, the signal processing implemented in signal analyzer 650 may include the steps of: (i) computing an earthquake indicator P(t) in response to digital signals $642_1$-$642_3$; (ii) comparing the earthquake indicator with a threshold value; (iii) recording and time-stamping the instances in which the earthquake indicator P(t) exceeds the threshold value; (iv) determining a maximum value of the earthquake indicator P(t) over a time interval; and (iv) reporting observations and measurements to an appropriate control entity (e.g., 710, FIG. 7) via control signal 462.

In an example embodiment, signal analyzer 650 may be programmed to compute the earthquake indicator P(t) as follows:

$$P(t)=|F_1(t)|+|F_2(t)|+|F_3(t)| \quad (13)$$

where $F_1(t)$ represents the band-pass-filtered digital signal $S_1'$; $F_2(t)$ represents the band-pass-filtered digital signal $S_2'$; $F_3(t)$ represents the band-pass-filtered digital signal $S_3'$; and t is time. The maximum value of the earthquake indicator P(t) can be used, e.g., to estimate the magnitude of the corresponding earthquake, e.g., as described below in reference to FIGS. 7-8.

Let us assume that the earthquake indicator $P_U(t)$ that is being computed at the uplink optical receiver 270 (located at landing station $102_2$, FIG. 1) reaches or exceeds the threshold value $P_{0,U}$ (i.e., $P_U(t) \geq P_{0,U}$) at the time stamp to (i.e., at $t=t_U$). Then, the time $t_0$ at which mechanical disturbances 190 hit the corresponding fiber span 140 can be estimated as follows:

$$t_0 = t_U - \frac{n_f \cdot D_2}{c} \quad (14)$$

where $n_f$ is the effective refractive index of the fiber; $D_2$ is the fiber length between landing station $102_2$ and the location at which the mechanical disturbances 190 first hit the fiber (also see FIG. 1); and c is the speed of light. Similarly, at the downlink optical receiver 270 (located at landing station $102_1$, FIG. 1), the time to can be estimated as follows:

$$t_0 = t_D - \frac{n_f \cdot D_1}{c} \quad (15)$$

where $t_D$ is the time stamp at which the earthquake indicator $P_D(t)$ that is being computed at the downlink optical receiver 270 reaches or exceeds the threshold value $P_{0,D}$ (i.e., $P_D(t) \geq P_{0,D}$); and $D_1$ is the fiber length between landing station $102_1$ and the location at which the mechanical disturbances 190 first hit the fiber (also see FIG. 1). Combining Eqs. (14) and (15), one obtains the following equation:

$$t_0 = \frac{1}{2}\left(t_D + t_U - \frac{n_f \cdot Z}{c}\right) \quad (16)$$

where Z is the total length of optical fiber between landing stations $102_1$ and $102_2$ at different or opposite ends of the same optical fiber link. Since all quantities in the right-hand part of Eq. (16) are observable or known, Eq. (16) can be used to determine to. Eqs. (14) and (15) can then be used to determine the lengths $D_1$ and $D_2$.

Figure 7:
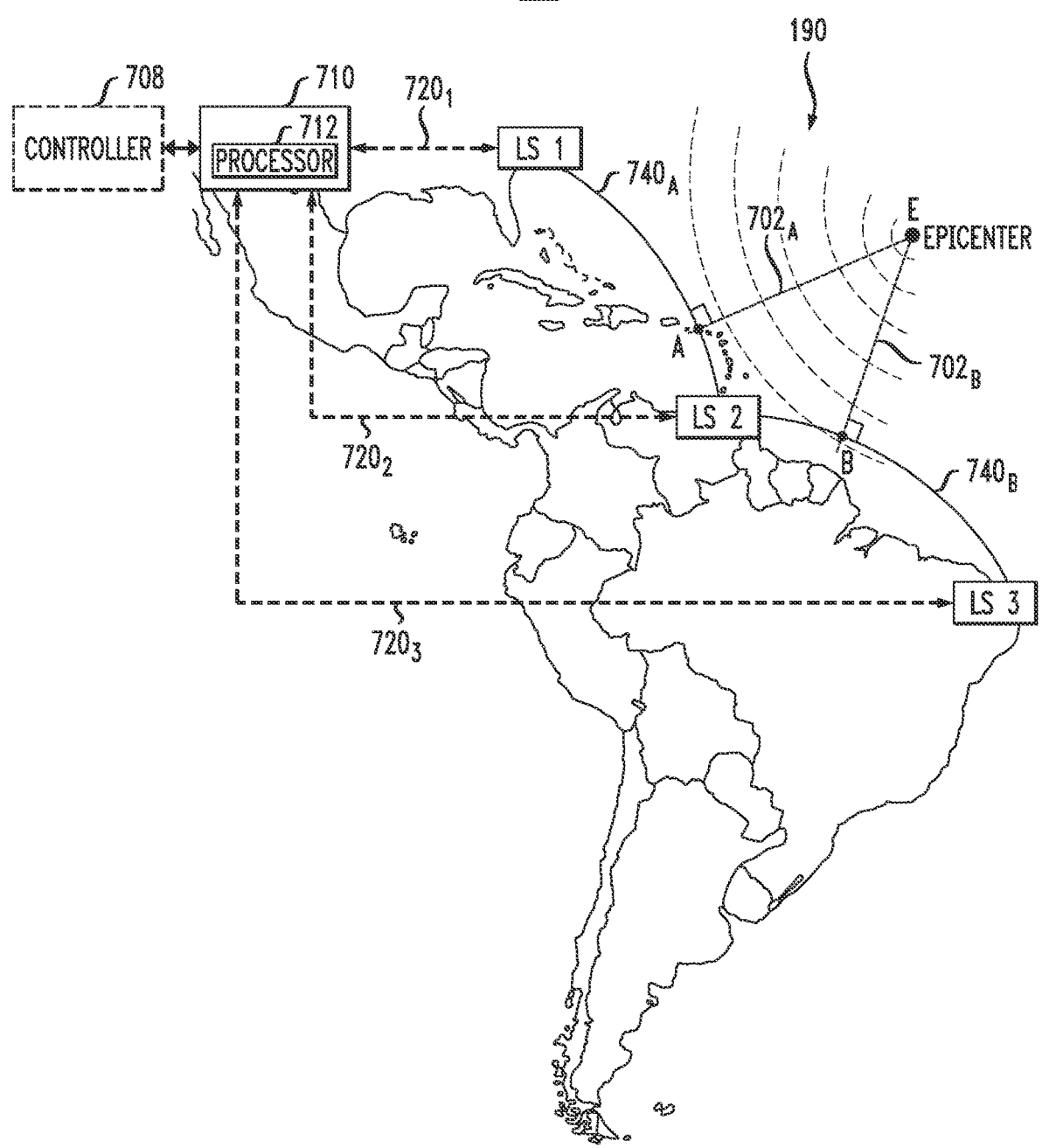
FIG. 7 shows a block diagram of a fiber-optic network in which some embodiments may be practiced.

FIG. 7 shows a block diagram of a portion 700 of a fiber-optic network in which some embodiments may be practiced. Network 700 comprises landing stations LS1, LS2, and LS3. Landing stations LS1 and LS2 are connected via a fiber-optic link $740_A$. Landing stations LS2 and LS3 are connected via a fiber-optic link $740_B$. Network 700 further comprises an electronic (e.g., digital) analyzer 710 connected to landing stations LS1, LS2, and LS3 via control links $720_1$, $720_2$, and $720_3$, respectively. In case of an earthquake, network 700 can be used to determine the geo-location E of the earthquake epicenter and to estimate the magnitude of the earthquake, e.g., using method 800 (FIG. 8). For example, the resulting pressure or displacement waves may spherically radiate from the epicenter, as illustrated, but terrestrial surface features may cause the radiating waves to have differently shaped wave-surfaces, which could be taken into account in an embodiment of method 800 (FIG. 8). In an example embodiment, each of landing stations LS1, LS2, and LS3 may be analogous to the above-described landing station $102_i$ (FIG. 1). In some embodiments, electronic analyzer 710 may be located at a corresponding control entity (e.g., a network controller) 708. In alternative embodiments, other locations of electronic analyzer 710 may also be possible, including distributed configurations in which different parts of the electronic analyzer are placed at two or more different, relatively distanced locations.

In an example embodiment, electronic analyzer 710 has appropriate circuitry, e.g., a digital processor 712, configured to process the received SOP measurements to characterize an earthquake.

In some embodiments, the corresponding fiber-optic network may comprise additional landing stations LS and/or additional fiber-optic links 740 (not explicitly shown in FIG. 7). For example, the two or more optical fiber links used to sense an earthquake may not share a landing station as in FIG. 8 so that measurements at four or more landing stations may be used to characterize an earthquake using method 800 (FIG. 8). Depending on the relative location of the earthquake epicenter E and the network topology, a suitable subset of the landing stations LS and fiber-optic links 740 may be selected for executing method 800 or other suitable method. For example, a triangulation method may be used when the selected subset of fiber-optic links 740 has three or more links.

FIG. 8 shows a flowchart of an example signal-processing method 800 that can be used in network 700 according to an embodiment. Method 800 is described below with continued reference to FIG. 7. The execution of method 800 can be triggered, e.g., by mechanical disturbances 190 emanating from the epicenter E of a sufficiently strong earthquake (also see FIGS. 1 and 7).

At step 802 of method 800, optical receivers 270 located at landing stations LS1, LS2, and LS3 detect an event in which the corresponding earthquake indicators P(t) (see, e.g., Eq. (13)) exceed the relevant threshold(s) in response to the mechanical disturbances 190 reaching the fiber-optic links $740_A$ and $740_B$.

At step 804, landing stations LS1, LS2, and LS3 use control links $720_1$, $720_2$, and $720_3$, respectively, to provide the relevant measurements of the event to electronic analyzer 710. In an example embodiment, landing stations LS1, LS2, and LS3 may collectively provide to electronic analyzer 710 the following measured parameters: (i) the time stamps $t_U$ and $t_D$ corresponding to fiber-optic link $740_A$; (ii) the maximum value $P_{UA}$ of the earthquake indicator P(t) observed for the uplink direction of fiber-optic link $740_A$; (iii) the maximum value $P_{DA}$ of the earthquake indicator P(t) observed for the downlink direction of fiber-optic link $740_A$; (iv) the time stamps $t_U$ and $t_D$ corresponding to fiber-optic link $740_B$; (v) the maximum value $P_{UB}$ of the earthquake indicator P(t) observed for the uplink direction of fiber-optic link $740_B$; and (vi) the maximum value $P_{DB}$ of the earthquake indicator P(t) observed for the downlink direction of fiber-optic link $740_B$.

At step 806, electronic analyzer 710 uses the time stamps provided thereto at step 804 to determine the locations of points A and B along the fiber-optic links $740_A$ and $740_B$, respectively (also see FIG. 7). More specifically, point A is the location along the fiber-optic link $740_A$ that is hit first by the mechanical disturbances 190. Similarly, point B is the location along the fiber-optic link $740_B$ that is hit first by the mechanical disturbances 190. The location of point A can be determined, e.g., using Eqs. (14)-(16) and the received time stamps $t_U$ and $t_D$ corresponding to the fiber-optic link $740_A$. The location of point B can similarly be determined, e.g., using Eqs. (14)-(16) and the received time stamps $t_U$ and $t_D$ corresponding to the fiber-optic link $740_B$.

At step 808, electronic analyzer 710 uses the geo-locations of the points A and B inferred from the processing performed at step 806 and the map of network 700 to determine the geo-location of the epicenter E. In the shown example, the geo-location of the epicenter E is determined as the intersection of lines $702_A$ and $702_B$, wherein the line $702_A$ is locally orthogonal to the fiber-optic link $740_A$ at point A, and the line $702_B$ is locally orthogonal to the fiber-optic link $740_B$ at point B.

In alternative embodiments of step 808, electronic analyzer 710 may use the geo-locations of the points A, B, and one or more analogous points corresponding to additional fiber-optic links 740 to determine the geo-location of the epicenter E by triangulation.

At step 810, electronic analyzer 710 uses the maximum values $P_{DA}$, $P_{UA}$, $P_{DB}$, and $P_{UB}$ of the earthquake indicators P(t) to estimate the Richter scale magnitude of the earthquake. In an example embodiment, step 810 may comprise the sub-steps of: (i) scaling the maximum values $P_{DA}$, $P_{UA}$, $P_{DB}$, and $P_{UB}$ by the respective scaling factors representing the estimated attenuation of the seismic waves along the respective propagation paths from the epicenter E determined at step 808 to the incidence points A and B determined at step 806; (ii) averaging the scaled maximum values computed at sub-step (i); and (iii) converting the average value computed at sub-step (ii) into the corresponding Richter scale magnitude. In an example embodiment, sub-step (iii) can be performed, e.g., using a look-up table compiled based on previous earthquake observations for which the Richter scale magnitudes were also measured by conventional seismological means.

At step 812, the geo-location of the epicenter E determined at step 808 and the Richter scale magnitude determined at step 810 are used, in a conventional manner, to forecast the expected tsunami magnitudes for the affected costal communities. If a significant tsunami wave is being forecast, then appropriate tsunami warnings may be issued, e.g., by way of network controller 708.

According to an example embodiment disclosed above, e.g., in the summary section and/or in reference to any one or any combination of some or all of FIGS. 1-8, provided is an apparatus to provide information on earthquakes, the apparatus comprising: an electronic analyzer (e.g., 710, FIG. 7) connected (e.g., via 720, FIG. 7) to receive measurements of states of polarization of pairs of light beams, the light beams of each one of the pairs of light beams having traveled in opposite directions between a respective pair of network nodes (e.g., LS1, LS2, FIG. 7) via a respective optical fiber cable (e.g., 740, FIG. 7) end-connecting the respective pair of network nodes, different ones of the pairs of light beams having traveled over different ones of the respective optical fiber cables; and wherein the electronic analyzer has circuitry (e.g., 712, FIG. 7) configured to characterize one of the earthquakes based on the measurements of the states of polarization of a plurality of the pairs of light beams.

In some embodiments of the above apparatus, the electronic analyzer is configured to estimate a region (e.g., A, FIG. 7) of first receipt of seismic waves (e.g., 190, FIG. 7) of an earthquake at one (e.g., $740_A$, FIG. 7) of the optical fiber cables based on the measurements of states of polarization of the light beams received at both network nodes (e.g., LS1, LS2, FIG. 7) end-connected by the one of the optical fiber cables.

In some embodiments of any of the above apparatus, the first receipt is identified by a measure of state of polarization (e.g., P(t), Eq. (13)) having an above-threshold frequency component spectrally below about 1 Hertz.

In some embodiments of any of the above apparatus, the electronic analyzer is configured to estimate a time (e.g., $t_0$, Eq. (16)) of the first receipt of seismic waves of the earthquake at the one of the optical fiber cables based on the measurements of states of polarization of the light beams received at the both network nodes.

In some embodiments of any of the above apparatus, the electronic analyzer is configured to identify an epicenter (e.g., E, FIG. 7) of the earthquake by estimating regions (e.g., A, B, FIG. 7) of first receipt of the seismic waves of the earthquake at two or more of the optical fiber cables (e.g., $740_A$, $740_B$, FIG. 7) based on the measurements of states of polarization of the light beams traveled over the two or more of the optical fiber cables.

In some embodiments of any of the above apparatus, the electronic analyzer is configured to estimate a time of first receipt of seismic waves of an earthquake at one of the optical fiber cables based on the measurements of states of polarization of the light beams received at both network nodes end-connected by the one of the optical fiber cables.

In some embodiments of any of the above apparatus, each of the measurements of a particular one of the received light beams measures mixtures of the particular one of the light beams with light of an optical local oscillator (e.g., 408, FIG. 4).

In some embodiments of the above apparatus, the apparatus further comprises one or more filters (e.g., 640, FIG. 6) to remove from the measurements frequency components spectrally higher than about 1 Hertz.

In some embodiments of any of the above apparatus, each particular pair of the network nodes is configured to optically communicate data therebetween via optical wavelength channels different from a wavelength channel carrying the light beams between the particular pair of optical nodes.

In some embodiments of any of the above apparatus, the light beams are not modulated to carry data streams.

According to another example embodiment disclosed above, e.g., in the summary section and/or in reference to any one or any combination of some or all of FIGS. 1-8, provided is a machine-implemented method of providing information on earthquakes, the machine-implemented method comprising the steps of: (A) receiving (e.g., at 804, FIG. 8) measurements of states of polarization of pairs of light beams, the light beams of each one of the pairs of light beams having traveled in opposite directions between a respective pair of network nodes (e.g., LS1, LS2, FIG. 7) via a respective optical fiber cable (e.g., 740, FIG. 7) end-connecting the respective pair of network nodes, different ones of the pairs of light beams having traveled over different ones of the respective optical fiber cables; and (B) processing (e.g., at 806-812, FIG. 8), in electronic circuitry (e.g., 712, FIG. 7), the measurements of the states of polarization of a plurality of the pairs of light beams to characterize one of the earthquakes.

According to yet another example embodiment disclosed above, e.g., in the summary section and/or in reference to any one or any combination of some or all of FIGS. 1-8, provided is an apparatus comprising: an optical wavelength demultiplexer (e.g., 280, FIG. 2) having a plurality of pass bands (e.g., 310, FIG. 3) to demultiplex optical signals received through an optical fiber (e.g., 140, FIG. 1; $740_A$, FIG. 7); a first optical receiver (e.g., $260_n$, FIG. 2) connected to the optical wavelength demultiplexer to receive a data-modulated optical signal (e.g., 262, FIG. 2); and a second optical receiver (e.g., 270, FIG. 2) connected to the optical wavelength demultiplexer to obtain time-resolved measurements of Stokes parameters of an optical-probe signal (e.g., 274, FIG. 2), both of the data-modulated optical signal and the optical-probe signal passing through one of the pass bands of the optical wavelength demultiplexer; and wherein the second optical receiver comprises a digital band-pass filter (e.g., 640, FIG. 6) to filter streams of the time-resolved measurements to select frequency components of the streams corresponding to seismic disturbance of the optical fiber.

In some embodiments of the above apparatus, the apparatus further comprises a plurality of third optical receivers (e.g., $260_3$-$260_{n-1}$, FIG. 2) connected to receive respective data-modulated optical signals (e.g., $266_3$-$266_{n-1}$, FIG. 2) through different respective ones of the pass bands of the optical wavelength demultiplexer.

In some embodiments of any of the above apparatus, each of the first optical receiver and the third optical receivers is configured to recover data encoded in a corresponding one of the data-modulated optical signals.

In some embodiments of any of the above apparatus, a carrier frequency (e.g., $f_s$, FIG. 3) of the optical-probe signal is different from a center frequency (e.g., $f_n$, FIG. 3) of the data-modulated optical signal.

In some embodiments of any of the above apparatus, a carrier frequency (e.g., $f_s$, FIG. 3) of the optical-probe signal is spectrally located at a spectral edge of the data-modulated optical signal (e.g., as shown in FIG. 3).

In some embodiments of any of the above apparatus, a carrier frequency (e.g., $f_s$, FIG. 3) of the optical-probe signal is spectrally located outside a spectral envelope (e.g., 212, FIG. 3) of the data-modulated optical signal (e.g., as shown in FIG. 3).

In some embodiments of any of the above apparatus, the second optical receiver comprises an optical local oscillator (e.g., 406, FIG. 4) for coherently detecting the optical-probe signal.

In some embodiments of any of the above apparatus, the second optical receiver is configured to: compute an earthquake indicator (e.g., P(t), Eq. (13)) based on the selected frequency components of the streams; and record and time-stamp a value of the earthquake indicator if said value exceeds a fixed threshold value.

In some embodiments of any of the above apparatus, the apparatus further comprises an electronic analyzer (e.g., 710, FIG. 7) connected (e.g., via $720_1$, FIG. 7) to receive the time-stamped value of the earthquake indicator from the second optical receiver and further connected to receive (e.g., via $720_2$, FIG. 7) another time-stamped value of the earthquake indicator from a network node (e.g., LS2, FIG. 7); and wherein the optical wavelength demultiplexer and the network node are end-connected to opposite ends of the optical fiber (e.g., $740_A$, FIG. 7).

In some embodiments of any of the above apparatus, the electronic analyzer is configured to determine (e.g., 808, FIG. 8) a geo-location (e.g., E, FIG. 7) of an earthquake epicenter based on said received time-stamped values of the earthquake indicator.

In some embodiments of any of the above apparatus, the electronic analyzer is configured to estimate (e.g., 810, FIG. 8), based on said received time-stamped values of the earthquake indicator, a Richter-scale magnitude of an earthquake.

In some embodiments of any of the above apparatus, the electronic analyzer is configured to generate (e.g., 812, FIG. 8) a forecast of tsunami waves based on said received time-stamped values of the earthquake indicator.

In some embodiments of any of the above apparatus, the optical-probe signal is a continuous-wave optical signal.

In some embodiments of any of the above apparatus, the digital band-pass filter has a pass band between 0.1 Hz and 1 Hz.

In some embodiments of any of the above apparatus, the digital band-pass filter is tunable.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus to provide information on earthquakes, the apparatus comprising:
   a plurality of network nodes connected by optical fiber cables;
   an electronic analyzer connected to receive measurements of states of polarization of pairs of light beams, the light beams of each one of the pairs of light beams having traveled in opposite directions between a respective pair of the network nodes via a respective one of the optical fiber cables end-connected therebetween, different ones of the pairs of light beams having traveled over different ones of the respective optical fiber cables; and
   wherein the electronic analyzer has circuitry configured to characterize one of the earthquakes based on the measurements of the states of polarization of a plurality of the pairs of light beams; and
   wherein each of the network nodes is configured to transmit one of the light beams by wavelength division multiplexing data-carrying optical signals and the one of the light beams, such that a carrier frequency of the one of the light beams is located at a spectral edge of one of the data-carrying optical signals.

2. The apparatus of claim 1, wherein the electronic analyzer is configured to estimate a region of first receipt of seismic waves of an earthquake at a particular one of the optical fiber cables based on the measurements of states of polarization of the light beams received at both of the network nodes to which the particular one of the optical fiber cables end-connects.

3. The apparatus of claim 2, wherein the electronic analyzer is configured to estimate a time of the first receipt of seismic waves of the earthquake at the particular one of the optical fiber cables based on the measurements of states of polarization of the light beams received at both of the network nodes to which the particular one of the optical fiber cables end-connects.

4. The apparatus of claim 2, wherein the electronic analyzer is configured to identify an epicenter of the earthquake by estimating regions of first receipt of the seismic waves of the earthquake at two or more of the optical fiber cables based on the measurements of states of polarization of the light beams traveled over the two or more of the optical fiber cables.

5. The apparatus of claim 1, wherein the electronic analyzer is configured to estimate a time of first receipt of seismic waves of an earthquake at a particular one of the optical fiber cables based on the measurements of states of polarization of the light beams received at both of the network nodes to which the particular one of the optical fiber cables end-connects.

6. The apparatus of claim 1, wherein each of the measurements of a particular one of the received light beams measures mixtures of the particular one of the light beams with light of an optical local oscillator.

7. The apparatus of claim 1, further comprising one or more filters to remove, from the measurements, frequency components spectrally higher than about 1 Hertz.

8. The apparatus of claim 1, wherein each particular one of the pairs of the network nodes is configured to optically communicate data therebetween via optical wavelength channels different from a wavelength channel carrying the light beams between the particular one of the pairs of the network nodes.

9. The apparatus of claim 1, wherein the light beams are not modulated to carry data streams.

10. A machine-implemented method of providing information on earthquakes, the machine-implemented method comprising:
    receiving a pair of light beams at each of a plurality of pairs of network nodes; and
    receiving measurements of states of polarization of the pairs of light beams, the light beams of each one of the pairs of light beams having traveled in opposite directions between a respective one of the pairs of network nodes via a respective optical fiber cable end-connected therebetween, different ones of the pairs of light beams having traveled over different ones of the respective optical fiber cables; and
    processing, in electronic circuitry, the measurements of the states of polarization of a plurality of the pairs of light beams to characterize one of the earthquakes; and
    wherein each of the network nodes is configured to transmit one of the light beams by wavelength division multiplexing data-carrying optical signals and the one of the light beams, such that a carrier frequency of the one of the light beams is located at a spectral edge of one of the data-carrying optical signals.

11. An apparatus, comprising:
    an optical wavelength demultiplexer having a plurality of pass bands to demultiplex optical signals received through an optical fiber;
    a first optical receiver connected to the optical wavelength demultiplexer to receive a data-modulated optical signal; and
    a second optical receiver connected to the optical wavelength demultiplexer to obtain time-resolved measurements of Stokes parameters of an optical-probe signal, both of the data-modulated optical signal and the optical-probe signal passing through one of the pass bands of the optical wavelength demultiplexer; and wherein the second optical receiver comprises a digital band-pass filter to filter streams of the time-resolved measurements to select frequency components of the streams corresponding to seismic disturbance of the optical fiber.

12. The apparatus of claim 11, further comprising a plurality of third optical receivers connected to receive respective data-modulated optical signals through different respective ones of the pass bands of the optical wavelength demultiplexer.

13. The apparatus of claim 11, wherein a carrier frequency of the optical-probe signal is different from a center frequency of the data-modulated optical signal.

14. The apparatus of claim 11, wherein a carrier frequency of the optical-probe signal is spectrally located at a spectral edge of the data-modulated optical signal.

15. The apparatus of claim 11, wherein a carrier frequency of the optical-probe signal is spectrally located outside a spectral envelope of the data-modulated optical signal.

16. The apparatus of claim 11, wherein the second optical receiver comprises an optical local oscillator for coherently detecting the optical-probe signal.

17. The apparatus of claim 11, wherein the second optical receiver is configured to:

compute an earthquake indicator based on the selected frequency components of the streams; and record and time-stamp a value of the earthquake indicator if said value exceeds a fixed threshold value.

18. The apparatus of claim 17, further comprising an electronic analyzer connected to receive the time-stamped value of the earthquake indicator from the second optical receiver and further connected to receive another time-stamped value of the earthquake indicator from a network node; and wherein the optical wavelength demultiplexer and the network node are end-connected to opposite ends of the optical fiber.

19. The apparatus of claim 18, wherein the electronic analyzer is configured to produce at least one of the following estimates:

an estimate of a geo-location of an earthquake epicenter based on said received time-stamped values of the earthquake indicator;

an estimate of a Richter-scale magnitude of an earthquake based on said received time-stamped values of the earthquake indicator; and a forecast of tsunami waves based on said received time-stamped values of the earthquake indicator.

* * * * *